United States Patent [19]

Nitadori

[11] 4,053,713
[45] Oct. 11, 1977

[54] MULTI-CHANNEL MULTIPLEX DATA TRANSMISSION SYSTEM

[75] Inventor: Kazuhiko Nitadori, Tokyo, Japan

[73] Assignee: Oki Electric Industry Co., Ltd., Tokyo, Japan

[21] Appl. No.: 654,340

[22] Filed: Feb. 2, 1976

[30] Foreign Application Priority Data

Feb. 5, 1975 Japan .................................. 50-14232

[51] Int. Cl.$^2$ ............................................. H04J 11/00
[52] U.S. Cl. ................................ 179/15 BC; 325/136; 325/331; 333/18
[58] Field of Search .......... 179/15 BC, 15 FD, 15 ES, 179/1 GQ; 325/60, 136, 331, 476; 332/21, 40, 45; 333/18

[56] References Cited

U.S. PATENT DOCUMENTS

| 3,163,718 | 12/1964 | Deman | 325/60 |
| 3,443,229 | 5/1969 | Becker | 179/15 BC |
| 3,488,445 | 1/1970 | Chang | 179/15 BC |
| 3,813,483 | 5/1974 | Kurosawa | 179/15 BC |

Primary Examiner—David L. Stewart
Attorney, Agent, or Firm—Kenyon & Kenyon

[57] ABSTRACT

The sum and difference signals of a pair of data channels are applied to a pair of roll-off filters, respectively. The outputs of said roll-off filters are modulated by a pair of carrier signals which have the phase difference ($\pi/2$) to each other. The modulated signals are added to each other in an adder and a single output signal is provided from the output of said adder. Said output signal and another output signal relating to another pair of data channels, and some pilot signals are applied to an adder, the output of which is transmitted to a receiving station in the form of a multi-channel multiplex data signal. At the receiving station, the received signal is demodulated with the inverse process of the above modulation steps and the demodulated data signals are applied to an automatic equalizer. The present invention described above provides high speed data transmission through a narrow-band-line which has only almost the Nyquist band width.

10 Claims, 15 Drawing Figures

MULTI-CHANNEL MULTIPLEX DATA TRANSMISSION SYSTEM

BACKGROUND OF THE INVENTION

The present invention relates to an improved data transmission system, and in particular, relates to a digital type multi-channel modulation and/or demodulation system which transmits digital data through a band-limited analog type transmission line.

A multi-channel orthogonal VSA (Vestigial Side-Band) transmission system has been known as one of the data transmission systems using a band-limited analog type line. The prior modulation and/or demodulation system for the above orthogonal VSB system comprises a plurality of the transmission filters for each channel in a modulator and a correlation detector in a demodulator, and is disclosed in R. W. Chang;

"Synthesis of Band-Limited Orthogonal Signals for Multi-channel Data Transmission," B.S.T.J., 45, 10, p. 1775 (Dec. 1966). The present applicant has already filed some patent applications which improve Chang's device.

In the prior system proposed by Chang, a data transmission system with a theoretical transmission speed could be realized without suffering from a inter-symbol interference and/or a inter-channel interference, if an ideal line equalization and a modem were obtained. However, said theoretical speed could not be practically obtained due to come interferences by the various error factors.

SUMMARY OF THE INVENTION

It is an object, therefore, of the present invention to overcome the disadvantages and limitations of a prior data transmission system by providing a new and improved data transmission system.

According to the present invention, the sum and the difference signals of a pair of data channels are applied to a pair of roll-off filters, respectively. The outputs of said roll-off filters are modulated by a pair of carrier signals which have the phase difference ($\pi/2$) to each other. The modulated signals are added to each other in an adder and a single output signal is provided from the output of said adder. Said output signal and another output signal relating to another pair of data channels, and some pilot signals are applied to an adder, the output of which is transmitted to a receiving station in the form of a multichannel multiplex data signal. At the receiving station, the received signal is demodulated with the inverse process of the above modulation steps and the demodulated data signals are applied to an automatic equalizer. The present invention described above provides high speed data transmission through a narrow-band-line which has only almost the Nyquist band width.

BRIEF DESCRIPTION OF THE DRAWINGS

The foregoing and other objects, features, and attendant advantages of the invention will be appreciated as the same become better understood by means of the following description and accompanying drawings wherein.

DESCRIPTION OF THE PREFERRED EMBODIMENTS

The embodiments of a four channel data transmission system will be explained hereinafter, however, the invention is not of course limited to a four channel system and any number channel system is possible with the invention.

Figure 1:
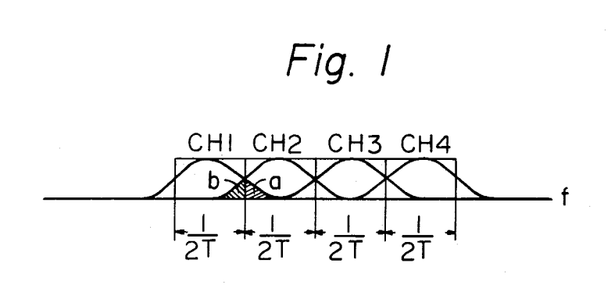
FIG. 1 shows a frequency spectrum of a data signal according to the present invention.

A well-known theory teaches us that the band width required for transmitting a pulse train of a repetition period T is ($1/2T$) and said band width is called a Nyquist band. However, in a transmission system having the band width of exactly ($1/2T$), the demodulation of a signal is very difficult since only a small deviation of a sampling pulse results in a large error due to a narrow eye pattern. Therefore, in an actual system, a VSB (Vestigial Side-Band) system is utilized. However, a VAB system requires a wider band width than a Nyquist band ($1/2T$). In order to solve that problem, the present invention overlaps the roll-off portions in each VSB channel with each other, as shown in FIG. 1. In FIG. 1, it should be appreciated that the roll-off portion (a) of the channel 1 overlaps with the roll-off portion (b) of the channel 2.

According to the frequency allocation of FIG. 1, the entire band-with required for the transmission of four channels is almost equal to $2/T(=[1/2T]\times 4)$, which is the Nyquist band-width of four channels.

Figure 2:
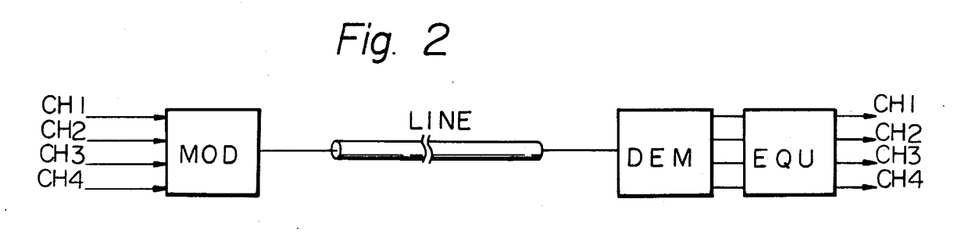
FIG. 2 is a brief block-diagram of the present data transmission system.

FIG. 2 shows a brief block-diagram of a data transmission system according to the present invention. In FIG. 2, the modulator (MOD) receives the signals from channels 1, 2, 3 and 4, and modulates them. The modulated signal having the frequency spectrum of FIG. 1 is transmitted to the demodulator (DEM) at a receiving side through a line (LINE). The demodulator (DEM) demodulates the signal and provides the original four channel signals, which appear at the output terminals of each channel through an equalizer (EQU). Each of the members MOD, DEM, and EQU in FIG. 2 will be explained in detail hereinafter.

Figure 3:
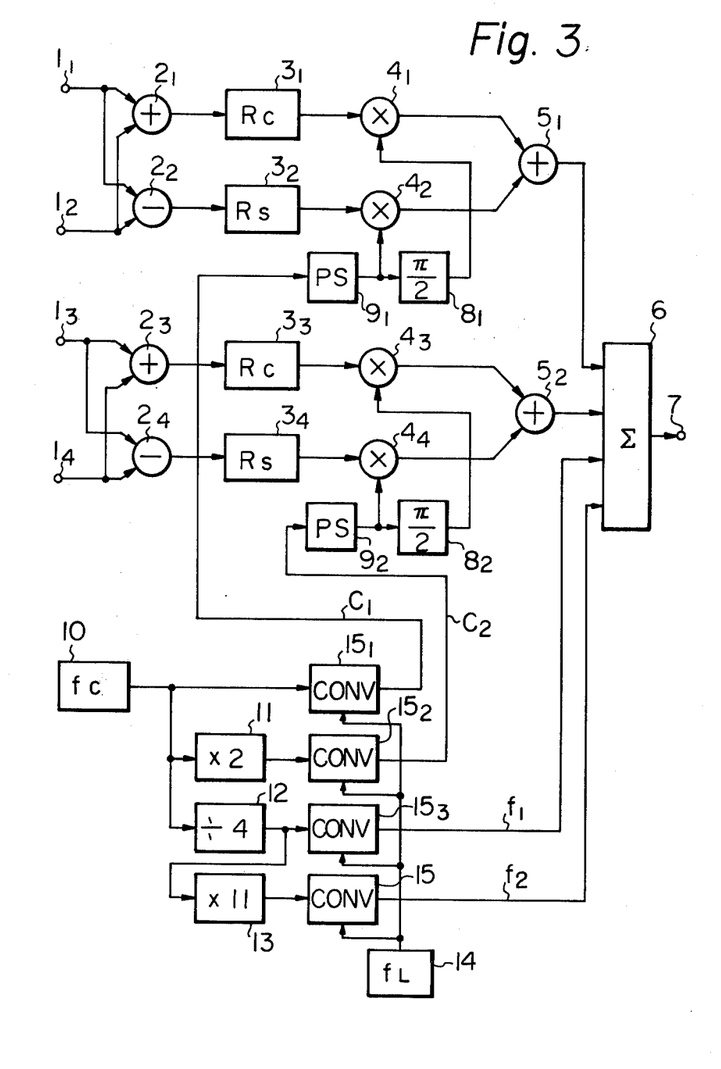
FIG. 3 is a block-diagram of the modulator according to the present invention.
Figure 4:
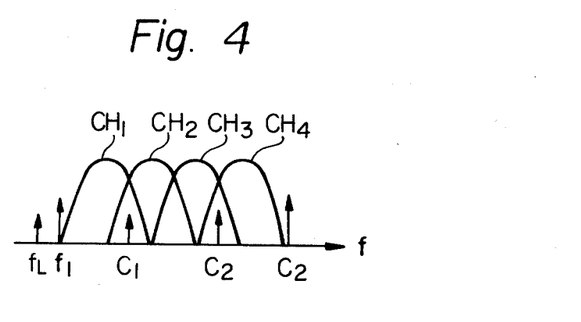
FIG. 4 is a frequency spectrum of a transmitted signal.

FIG. 3 shows an embodiment of modulator according to the present invention, in which $1_1, \ldots, 1_4$ are input terminals of channels 1, ..., 4; $2_1$ and $2_3$ are adders; $2_2$ and $2_4$ are substracting units (to be referred to as "subtracters", hereinafter); $3_1$ and $3_3$ are roll-off filters with a transfer function $R_c(f)$ to be explained later; $3_2$ and $3_4$ are roll-off filters with a transfer function $R_s(f)$ to be explained later; $4_1, ..., 4_4$ are multipliers; $5_1, 5_2$, and 6 are adders; 7 is an output terminal; $8_1$ and $8_2$ are 90°-phase shifters; $9_1$ and $9_2$ are variable phase shifters; 10 is a clock frequency generator; 11 is a frequency doubler; 12 is a factor 4 frequency devider; 13 is a factor 11 frequency multiplier; 14 is a local oscillator; and $15_1, ..., 15_4$ are frequency converters. In the modulator, the input signals for each channel are applied to the input terminals $1_1, ..., 1_4$ in the form of multi-amplitude PAM signals, and the adders $2_1, 2_3$ and subtracters $2_2$ and $2_4$ produce sums and differences of the input signals of a pair of the channel 1 and the channel 2 and another pair of the channel 3 and the channel 4. The output signals from the adders and the subtracters are shaped by the roll-off filters $3_1, ..., 3_4$, and act to amplitude-modulate carrier waves $C_1$ and $C_2$ by the multipliers $4_1, ..., 4_4$, which carrier waves are output signals from the frequency converters $15_1$ and $15_2$. The adders $5_1, 5_2$, and 6 add the thus modulated signals and pilot signals $f_1$ and $f_2$ which are output signals from the frequency converters $15_3$ and $15_4$, so as to deliver the added signal to the output terminal 7. The clock frequency generator 10 generates a sinusoidal wave whose frequency is identical with the repetition frequency $f_c$ of the input signal of each channel. The frequency doubler 11 generates a sinusoidal wave with its double frequency $2f_c$, and the factor 4 frequency divider 12 generates a sinusoidal wave with its quarter frequency $(\frac{1}{4})f_c$, and the factor 11 frequency multiplier 13 generates a sinusoidal wave with its elevenquarters frequency $(11/4)f_c$. The frequency converters $15_1, ..., 15_4$ mix the signals generated by the aforesaid generators 10, 11, 12, and 13 with a sinusoidal wave with a frequency $f_L$ generated by the local oscillator 14, so as to produce sinusoidal waves $C_1, C_2, f_1$, and $f_2$ whose frequencies are the sums or differences of the aforesaid frequencies. FIG. 4 illustrates the relations among the frequencies of the aforesaid sinusoidal waves and the spectra of the signals (shown in solid lines) at the output terminals 7, wherein $f_1$ and $f_2$ are pilot signals, $C_1$ and $C_2$ are carrier waves (suppressed), $f_L$ is the local oscillator signal (suppressed, and $CH_1, ..., CH_4$ are spectra of transmitting signals of the channels 1, ..., 4.

Figure 5:
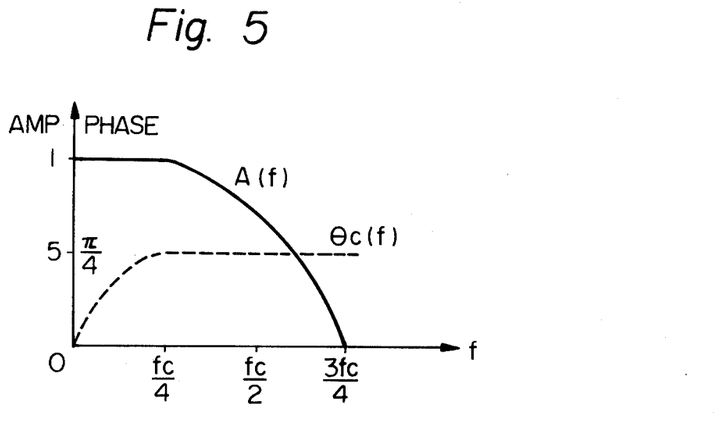
FIG. 5 is a characteristics curve of a roll-off filter.

The transfer functions $R_c(f)$ and $R_s(f)$ of the roll-off filters $3_1, ..., 3_4$ of FIG. 3 are band-restricted to band widths of $|f| < (\frac{3}{4})f_c$, and the amplitude characteristics of both of the transfer functions have a 50% roll-off characteristic $A(f)$ satisfying the Nyquist criterion, and the phase characteristics of the transfer function $R_c(f)$ is $\theta_c(f)$, except for a certain delay, and the phase characteristics of the transfer function $R_s(f)$ is $-\theta_c(f)$, except for a certain delay. Here, $\theta_c(f)$ is a function which has a constant value of $\pi/4$ in the band of $|f-f_c/2| < f_c/4$, and arbitrary values at other frequencies. FIG. 5 illustrates an example of the amplitude characteristic $A(f)$ of the transfer function $R_c(f)$ and the phase characteristic $\theta_c(f)$ of the transfer function $R_c(f)$, except for the certain delay. The variable phase shifters $9_1$ and $9_2$ give certain phase delays to the carrier waves $C_1$ and $C_2$ for compensating for the certain delays of the roll-off filters $3_1$ and $3_2$ and the like, so as to ensure the orthogonality relation between the channel 2 and the channel 3 having different carrier waves.

It is noted here that the roll-off filters $3_1$ and $3_2$ and the like can have an arbitrary roll-off factor of not greater than 50%, and the band width in which the phase characteristics $\theta_c(f)$ is constant at $\pi/4$ can be $|f-f_c/2| < b \cdot f_c/2$, where $b$ is a roll-off factor having a value of $0 < b \leq 0.5$.

Figures 6, 7:
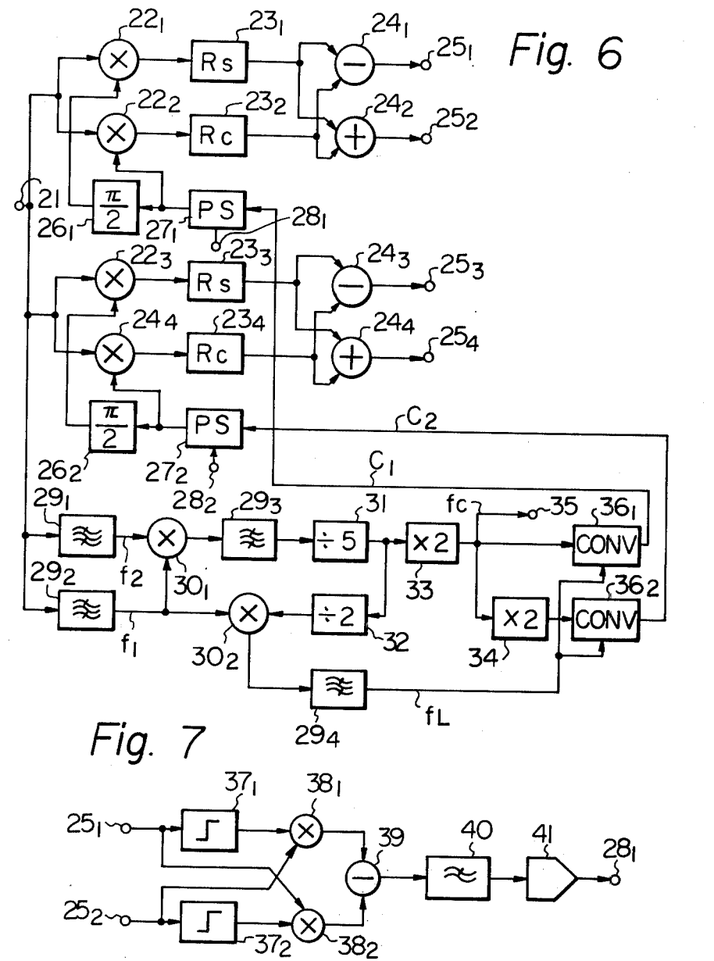
FIG. 6 is a block-diagram of a demodulator according to the present invention.
FIG. 7 is a phase error detector utilized with the demodulator of FIG. 6.

FIG. 6 shows an embodiment of a demodulator to be used in the present invention, in which 21 is an input terminal; $22_1, ..., 22_4$ and $30_1, 30_2$ are multipliers; $23_1, 23_3$ and $23_2, 23_4$ are roll-off filters whose characteristics are the same as those of the roll-off filters $3_2, 3_4$ and $3_1, 3_3$ of FIG. 3, respectively; $24_1$ and $24_3$ are substracters; $24_2$ and $24_4$ are adders; $25_1, ..., 25_4$ are output terminals of the channels 2, ..., 4, respectively; $26_1$ and $26_2$ are 90°-phase shifters; $27_1$ and $27_2$ are variable phase shifters which vary phase delays in proportion to carrier wave phase control signals applied to their control terminals $28_1$ and $28_2$, respectively; $29_1, 29_2, 29_3$, and $29_4$ are narrow-band-pass filters whose central frequencies are $f_2, f_1, f_2-f_1$, and $f_L$, respectively; 31 is a factor 5 frequency divider; 32 is a factor 2 frequency divider; 33 and 34 are frequency doublers; 35 is a clock signal output terminal; and $36_1$ and $36_2$ are frequency converters. In the demodulator, the pilot signals $f_2$ and $f_1$ are extracted from the received signals by the narror-band-pass filters $29_1$ and $29_2$, respectively, at the input terminal 21 and a sinusoidal wave with the differential frequency of the pilot signals, i.e., $f_2-f_1=(5/2)f_c$ is produced by passing the pilot signals through a frequency converter consisting of the multiplier $30_1$ and the narrow-band-pass filter $29_3$, and the output from the frequency converter is passed through the factor 5 frequency divider 31 for producing a sinusoidal wave with a frequency of $f_c/2$. Then, the factor 2 frequency divider 32 generates a sinusoidal wave of frequency $f_c/4$ from the wave at the output of the factor 5 frequency divider 31, and the multiplier $30_2$ mixes the wave from the divider 32 with the pilot signal $f_1$, so as to reproduce the local oscillator signal $f_L$ by passing the signal from the multiplier $30_2$ through the narrow-band-pass filter $29_4$. On the other hand, the $f_c/2$ signal is applied to the frequency doubler 33 for regenerating the clock signal $f_c$, which clock signal is delivered to the clock signal output terminal 35 and directly to the frequency converter $36_1$ for generating the carrier wave $C_1$ with a frequency equivalent to the sum (or difference) with the local oscillator signal $f_L$ and also to the other frequency converter $36_2$ through the frequency doubler 34 for generating the other carrier wave $C_2$. The thus reproduced carrier waves $C_1$ and $C_2$ are used for demodulating the PAM signals of each channel which are orthogonal-VSB modulated. At first, the phase of the carrier wave $C_1$ is delayed by a suitable amount by the variable phase shifter $27_1$, and the output from the phase shifter $27_1$ is directly applied to the multiplier $22_2$ and also to the other multiplier $22_1$ through the phase shifter $26_1$ delaying the phase by 90°. The outputs from the multipliers $22_1$ and $22_2$ are applied to the roll-off filters $23_1$ and $23_2$, respectively, so as to demodulate those signals which are modulated by the inphase component and quadrature component of the carrier wave $C_1$ in the modulator of FIG. 3, and the subtractor $24_1$ and the adder $24_2$ produce the difference and the sum of the outputs from the roll-off filters $23_1$ and $23_2$ for delivering the output signals of the channels 1 and 2 at the output terminals $25_1$ and $25_2$. Similarly, the output signals of the channels 3 and 4 are obtained at the output terminals $25_3$ and $25_4$, by using the carrier wave $C_2$.

With the aforesaid modulation and demodulation, it is possible to perform data transmission which is free from the interference between signals of individual channels (to be referred to as "inter-symbol interference", hereinafter) and free from the interference between channels (to be referred to as "inter-channel interference", hereinafter), as will be described hereinafter. If it is assumed that the transmission line is ideally equalized in the bands for passing the signal spectra of FIG. 4, the impulse response of the channel 1 path from the modulator input terminal $1_1$ to the demodulator output terminal $25_1$ is given by $$h_{11}(t) = [r_c(t)\cos(2\pi f_c t + \phi_t) + r_s(t)\sin(2\pi f_c t + \phi_t)]$$
$$\times \cos(2\pi f_c t + \phi_r) \otimes r_c(t) + [r_c(t)\cos(2\pi f_c t + \phi_t)$$
$$+ r_s(t)\sin(2\pi f_c t + \phi_t)]\sin(2\pi f_c t + \phi_r) \otimes r_s(t) \quad (1)$$

here, $r_c(t)$ and $r_s(t)$ are inverse Fourier transforms of the transfer functions $R_c(f)$ and $R_s(f)$, $f_{c1}$ is the frequency of the carrier wave $C_1$, $\phi_t$ and $\phi_r$ are phase angles of the carrier waves in modulation and demodulation, and $\otimes$ represents convolution operation.

Upon Fourier transformation of the both sides of the equation (1) while considering the conditions of the roll-off filter band restrictions, the transfer function of the channel 1 is given by $$H_{11}(f) = \cos(\phi_t - \phi_r) R_c(f) R_s(f) + \tfrac{1}{2} \sin(\phi_t - \phi_r)$$
$$[R_s(f)^2 - R_c(f)^2] \quad (2)$$

If the transfer functions $R_c(f)$ and $R_s(f)$ are given by the following equation (3), as pointed out above, and if the condition of $\phi_t = \phi_r$ is satisfied by successively synchronizing the phase angles of the carrier wave, then the equation (2) can be rewritten as the following equation (4).

$$R_c(f) = A(f)\exp[i\theta_c(f) + i2\pi f d]$$
$$R_s(f) = A(f)\exp[-i\theta_s(f) + i2\pi f d] \quad (3)$$
$$H_{11}(f) = A(f)^2 \exp[i4\pi f d] \quad (4)$$

here, $d$ is the delay of the roll-off filters.

Since the amplitude characteristic $A(f)$ is assumed to satisfy the Nyquist criterion, the channel which has the transfer function of the equation (4) can transmit data without any inter-symbol interference therein. The same applies to other channels, too. The transfer function $H_{12}(f)$ from the input of the channel 1 to the output of the channel 2 and the transfer function $H_{21}(f)$ from the input of the channel 2 to the output of the channel 1 are given by $$H_{12}(f) = \tfrac{1}{2}\sin(\phi_t - \phi_r)[R_s(f)^2 + R_c(f)^2]$$
$$H_{21}(f) = -H_{12}(f) \quad (5)$$

Thus, if the condition of $\phi_t = \phi_r$ is satisfied, as in the foregoing assumption, both transfer function $H_{12}(f)$ and $H_{21}(f)$ become zero, and the inter-channel interference between the channels 1 and 2 disappears. Similarly, the inter-channel interference between the channels 3 and 4 can be eliminated.

The interference between channels having different carrier waves will now be described. If the transfer function of a path from the input of a channel $j$ to the output of a channel $k$ is represented by $H_{jk}(f)$ ($j,k = 1,2,3,4,$), then such transfer functions can be given by the following equations, as in the case of the equations (5).

$$H_{13}(f) = H_{24}(f) = H_{14}(f) = H_{31}(f) = H_{42}(f) = H_{41}(f) = 0$$

$$h_{32}(f) = -ie^{i4\pi f d}A(f)\,[A(f-f_c)\exp\{-i2\pi f_c d + i(\phi_{t2}$$
$$-\phi_{r1})\} - A(f+f_c)\exp\{i2\pi f_c d - i(\phi_{t2} - \phi_{r1})\}] \quad (6)$$

$$H_{23}(f) = -ie^{i4\pi f d}A(f) \cdot [A(f-f_c)\exp\{-i2\pi f_c d - i(\phi_{t1} - \phi_{r2})\} - A(f+f_c)\exp\{i2\pi f_c d + i(\phi_{t1} - \phi_{r2})\}]$$

here, $\phi_{t1}$ and $\phi_{r1}$ are the transmitting end phase angle and the receiving end phase angle of the carrier wave $C_1$, and $\phi_{t2}$ and $\phi_{r2}$ are the transmitting end phase angle and the receiving end phase angle of the carrier wave $C_2$.

Thus, there is no interference at all, except the interference between the channels 2 and 3. As regards the interference between the channels 2 and 3, if the carrier phase angles are suitably controlled in the modulation and demodulation so as to satisfy the conditions of $$\phi_{t2} - \phi_{r1} = 2\pi f_c d$$
$$\phi_{t1} - \phi_{r2} = -2\pi f_c d \quad (7)$$

then, the Nyquist criterion is satisfied, and the transfer functions become zero at sampling points with intervals of $T = 1/f_c$ and there is no interference for the data transmission. In order to provide the phase differences to the carrier waves $C_1$ and $C_2$ for satisfying the conditions of the equations (7), the modulator of FIG. 3 uses the variable phase shifters $9_1$ and $9_2$.

To ensure satisfactory operation of the demodulator of FIG. 6, it is necessary to synchronize the phase angle of the carrier wave, and suitable phase angle of the carrier wave, and suitable phase control signals must be applied to the control terminals $28_1$ and $28_2$ of the variable phase shifters $27_1$ and $27_2$.

FIG. 7 illustrates an example of a phase error detector which generates the phase control signals, wherein $25_1$, $25_2$ are input terminals connected to the output terminals $25_1$ and $25_2$ of FIG. 6. In FIG. 7, $37_1$ and $37_2$ are clippers; $38_1$ and $38_2$ are multipliers; 39 is a subtracter; 40 is a low-pass filter; 41 is an accumulator; and $28_1$ is an output terminal to be connected to the control terminal $28_1$ of FIG. 6. Here, a phase error signal $\sin(\phi_{t1} - \phi_{r1})$ of the carrier wave $C_1$ is produced at the output of the low-pass filter 40, and the accurate phase synchronization can be achieved, as will be explained hereinafter. If the inverse Fourier transform of the transfer function $H_{jk}(f)$ is represented by $h_{jk}(t)$, and if the transmission signal series of the channel $j$ is represented by $[x_{jn}]$, then the output signals of the channels 1 and 2 are given by the following equations (8), provided that noise and interference from other channels are negligible.

$$y_1(t) = \sum_{n=-\infty}^{\infty}[x_{1n}h_{11}(t-nT+2d) + x_{2n}h_{21}(t-nT+2d)]$$
$$y_2(t) = \sum_{n=-\infty}^{\infty}[x_{1n}h_{12}(t-nT+2d) + x_{2n}h_{22}(t-nT+2d)] \quad (8)$$

Since $h_{11}(t)$ and $h_{22}(t)$ have prominent peaks at $t=2d$, the following relations are satisfied.

$$sgn(y_1(mT)) \approx sgn(x_{1m})$$

here, sgn ( ) represents a sign function.

Thus, the clipper $37_1$ of FIG. 7 derives $sgn(y_1(t))$, and the multiplier $38_1$ produces the product of the output from the clipper $37_1$ and $y_2(t)$, and the subtracter 39 and the low-pass filter 40 produce a time average thereof, so as to provide the following output signal at the output thereof.

$$\int \text{sgn}(y_1(t)) \cdot y_2(t)dt \approx \sum_m |x_{1m}| h_{12}(2d) \quad (10)$$

Similarly, the circuit consisting of the clipper $37_2$, the multiplier $38_2$, and the low-pass filter 40 produces the following signal.

$$\int \text{sgn}(y_2(t)) \cdot y_1(t)dt \approx \sum_m |x_{2m}| h_{21}(2d) \quad (11)$$

Accordingly, the output of the filter 40 is a signal equivalent to the difference between the equations (10) and (11). Judging from the equation (5), $h_{12}(2d)$ is proportional to $\sin(\phi_t - \phi_r)$ and $h_{21}(2d)$ is proportional to its negative signal, so that the phase error signal $\sin(\phi_t - \phi_r)$ can be achieved at the output of the filter 40. Similarly, in order to ensure the phase synchronization of the carrier wave $C_2$, an identical circuit to that of FIG. 7 is used.

To reproduce the transmitted signal from the output signal of the demodulator of FIG. 6, sampling is necessary at intervals $T = 1/f_c$. Since clock signals of frequency $f_c$ are available at the clock signal output terminal 35 of FIG. 6, sampling signals can be produced by changing the phase of this signal.

Figure 8:
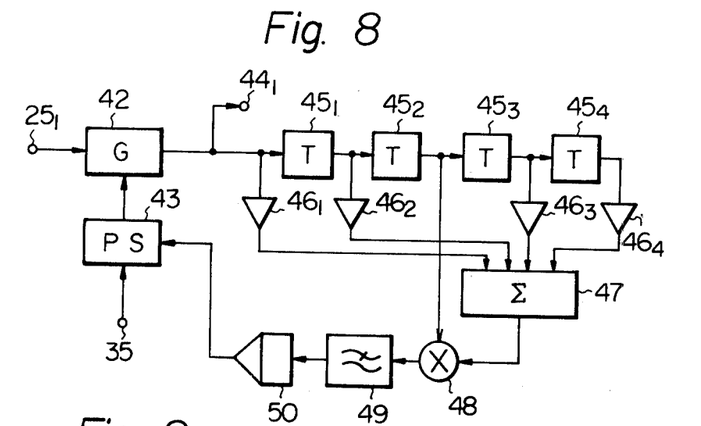
FIG. 8 is a sampling circuit utilized with the demodulator of FIG. 6.

FIG. 8 illustrates an example of sampling circuit, wherein $25_1$ is an input terminal; 42 is a sampling gate; 43 is a variable phase shifter; $44_1$ is an output terminal; $45_1$, ..., $45_4$ are 1-sample delay elements; $46_1$, ..., $46_4$ are attenuators; 47 is an adder; 48 is a multiplier; 49 is a low-pass filter; 50 is an accumulator; and 35 is a clock signal input terminal. The input terminal $25_1$ of FIG. 8 is connected to the output terminal $25_1$ of channel 1 of FIG. 6, and the phase of the sampling signal is so controlled as to minimize the dispersion of the intersymbol interference within the channel and to sample the output from the demodulator for delivering the sampled information at the output terminal $44_1$. Similar sampling circuits are connected to other channel outputs, too. The aforesaid control of the phase angle of the sampling signal can be explained as follows.

The dispersion of the inter-symbol interference in the channel 1 is given by the following equation, provided that the timing error of the sampling signal is $\tau$.

$$Q(\tau) = <[\sum_{m \neq 0} x_{1m} h_{11}(mT + 2d + \tau)]^2> \quad (12)$$

here, $< >$ represents an ensemble average.

To control $\tau$ so as to minimize the $Q(\tau)$, it is sufficient to find the gradient of $Q(\tau)$ with respect to $\tau$, and apply it to the accumulator 50 of FIG. 8. The gradient of $Q(\tau)$ with respect to $\tau$ is given by $$\frac{2Q(\tau)}{2\tau} = 2\sum_{m \neq 0} <x_{1m}^2> h_{11}(mT + 2d + \tau) \frac{2}{2\tau} h_{11}(mT + 2d + \tau) \quad (13)$$

Thus, if the gains of the attenuators $46_1$, ..., $46_4$ are set at $$h'_m = \frac{\delta}{\delta \tau} h_{11}(mT + 2d + \tau)|_{\tau=o} (n = -2, -1, 1, 2) \quad (13)'$$

and if the product of the following output signal from the adder 47

$$v_1 = \sum_{m \neq o} y_1(mT + 2d + \tau) h'_m$$

and the output signal $y_1(2d + \tau)$ from the delay element $45_2$ is formed by the multiplier 48 and its time average is made by the low-pass filter 49, then an approximate value of the gradient of the equation (13) in the proximity of $\tau = 0$ can be achieved.

In the foregoing description, two pilot signals are superposed to two ends of one signal spectrum, and the demodulator produces the necessary carrier waves and clock signals from such pilot signals, but if the frequencies of the carrier waves have a simple relation with the clock frequency, e.g., its integral multiples, only one pilot signal may be sufficient. Furthermore, it is possible to extract the carrier waves and the clock signal from the modulated signals, without using any pilot signals. As regards the extraction of the carrier waves, the method equivalent to that which was disclosed in the Japanese patent application 29413/1973 "Multi-channel Multiplex Demodulator" can be used; namely, the accumulator 41 of FIG. 7 and the variable phase shifter $27_1$ or $27_2$ of FIG. 6 can be replaced with voltage-controlled oscillators having central frequencies approximately equal to those of the carrier waves. Then, as regards the extraction of the clock signal, it is possible to use a method of detecting the beat of two carrier waves having adjacent frequencies (with a frequency difference of $f_c$) or to use a method as illustrated in FIG. 9 in the case of two channel transmission (with only one carrier wave) which method is used in a conventional VSB transmission.

Figure 9:
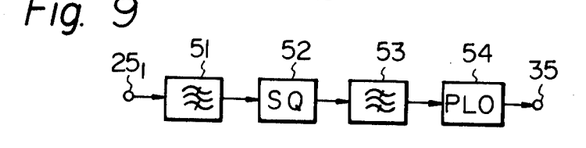
FIG. 9 is a clock pulse generator utilized with the sampling circuit of FIG. 8.

In FIG. 9, $25_1$ is an input terminal, which is connected to the output terminal $25_1$ of FIG. 6; 35 is a clock signal output terminal, which is, for instance, connected to the clock signal input terminal 35 of FIG. 8; 51 and 53 are band-pass filters having central frequencies of $f_c/2$ and $f_c$, respectively; 52 is a squaring equipment, and 54 is a phase-controlled oscillator having a frequency $f_c$ which generates the clock signal at its output terminal 35 by well-known operating principles.

As explained above, the interferences between channels and between symbols can be minimized by using the control through an automatic phase control loop for the purpose of controlling the phase synchronization of the carrier waves and the timing of the sampling. If the modulator-demodulator is ideal and the transmission line is ideally equalized, the inter-symbol interference and the inter-channel interferencecan be supressed to a sufficiently low level, but a considerable amount of interference remains in actual transmission lines and the data transmission is disturbed thereby. The present invention uses an automatic-equalizer of transversal filter type for compensating for such interferences, so as to realize a highly efficient data transmission.

Figure 10:
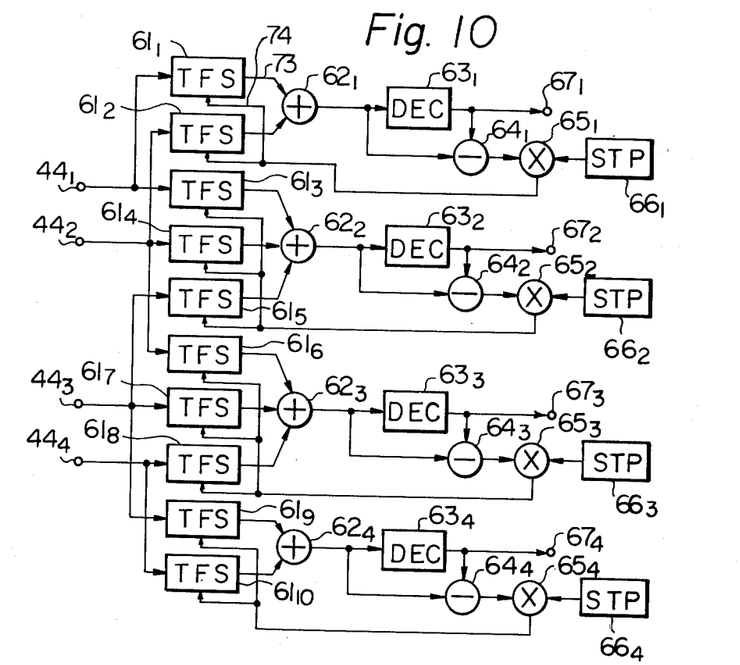
FIG. 10 is a block-diagram of the automatic equalizer according to the present invention.

FIG. 10 illustrates an automatic equalizer to be used in an embodiment of the present invention, in which $44_1, \ldots, 44_4$ are input terminals of channels $1, \ldots, 4$, respectively; $61_1, \ldots, 61_{10}$ are transversal filter portions; $62_1, \ldots, 62_4$ are adders; $63_1, \ldots, 63_4$ are decision circuits; $64_1, \ldots, 64_4$ are subtracters; $65_1, \ldots, 65_4$ are multipliers; $66_1, \ldots, 66_4$ are step generators; and $67_1, \ldots, 67_4$ are output terminals of the channels $1, \ldots, 4$, respectively.

Figure 11:
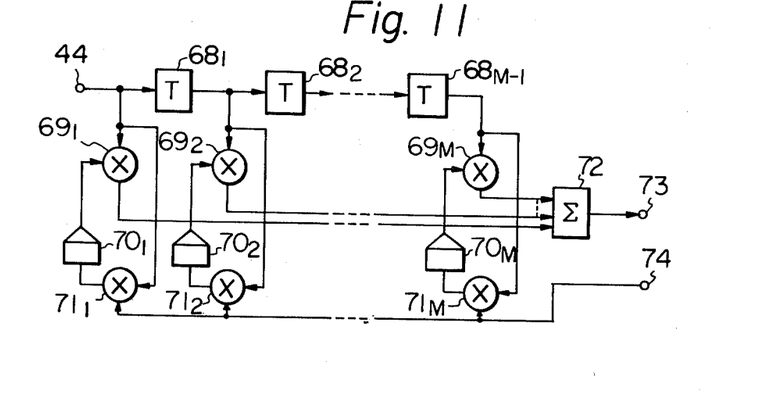
FIG. 11 is a block-diagram of a transversal filter (TFS) in the automatic filter of FIG. 10.

FIG. 11 shows the details of one of the transversal filter portions (TFS) $61_1$ through $61_{10}$ of FIG. 10, in which 44 is an input terminal; $68_1, \ldots, 68_{M-1}$ are onesample delay elements; $69_1, \ldots, 69_M$ are multipliers; $70_1, \ldots, 70_M$ are accumulators; $71_1, \ldots, 71_M$ are multipliers; 72 is an adder; 73 is an output terminal; and 74 is an error signal input terminal. Of all the TFS's $61_1$ through $61_{10}$, the TFS's $61_1, 61_4, 61_7,$ and $61_{10}$ are for compensating for the inter-symbol interferences within the channels 1, 2, 3, and 4, respectively, and the remainders are for compensating for the inter-channel interferences caused by adjacent channels. For instance, in the case of the channel 2, the input signal applied to the input terminal $44_2$ passes through the inter-symbol interference compensating TFS $61_4$ of that channel, and the output from the TFS's $61_3$ and $61_5$ compensating for the inter-channel interferences from the channels 1 and 3 are added by the adder $62_2$, and the transmitted multi-amplitude PAM signal is demodulated by the decision circuit $63_2$ consisting of a quantizing circuit and delivered to the output terminal $67_2$. On the other hand, the subtracter $64_2$ produces the difference between the input signal to the decision circuit $63_2$ and the output signal, i.e., an error signal, and the multiplier $65_2$ multiplies the error signal with an adapting step generated by the step generator $66_2$, so as to modify the amplitude thereof and to send the thus adapted signal to the error signal input terminal 74 of the TFS's $61_3, 61_4,$ and $61_5$. In each of the TFS's, the multipliers $71_1, \ldots, 71_M$ produce the products of such error signal and tapped output signals from a delay line consisting of the delay elements $68_1, \ldots, 68_{M-1}$, and the products are applied to the accumulators $70_1$ through $70_M$, respectively, so as to modify the weight coefficient of the transversal filter (i.e., the output signal from the accumulators) in such a manner that the sum of the inter-symbol interference and the inter-channel interference is minimized at the input to the decision circuit $63_2$. Thus, it is possible to effectively reduce the intersymbol interference and the inter-channel interference, by repeating the process of the adapting control a plurality of times and converging the weight coefficients of the filters of the TFS's to the proximity of the optimal values. The adapting steps are to decide the time constants of the adapting control loops, and they are generally large in the initial stages and gradually reduced, and their values may be fixed at constant values under normal conditions. As far as an automatic equalizer for one channel transmission is concerned, for instance, detailed description is provided in chapter 6 of the "Principles of Data Communication", by R.W. Lucky et al, McGraw-Hill (1968), but the automatic equalizer according to the present invention is formed by extending it for application to multi-channel transmission. As for the algorism of the adapting control, the MS method (means square method) has been described in the foregoing, but other algorisms, e.g., ZF method (zero-forcing method), can be also used.

As described above, since the inter-symbol intereference and the inter-channel interference can be effectively suppressed by using automatic equalizers having the adapting control loops, even if the equalization of the transmission line and the synchronization of the carrier waves and the timing synchronization are not perfect, it is possible to provide an efficient data transmission free from such interferences.

The aforesaid method, however, has a shortcoming in that the three transversal filters are necessary per channel, resulting in complicated and expensive devices. The following method mitigates such shortcoming, by suppressing the inter-channel interference by carrier synchronization and timing synchronization while only the intersymbol interference in each channel is compensated for by the transversal filters.

Figure 12:
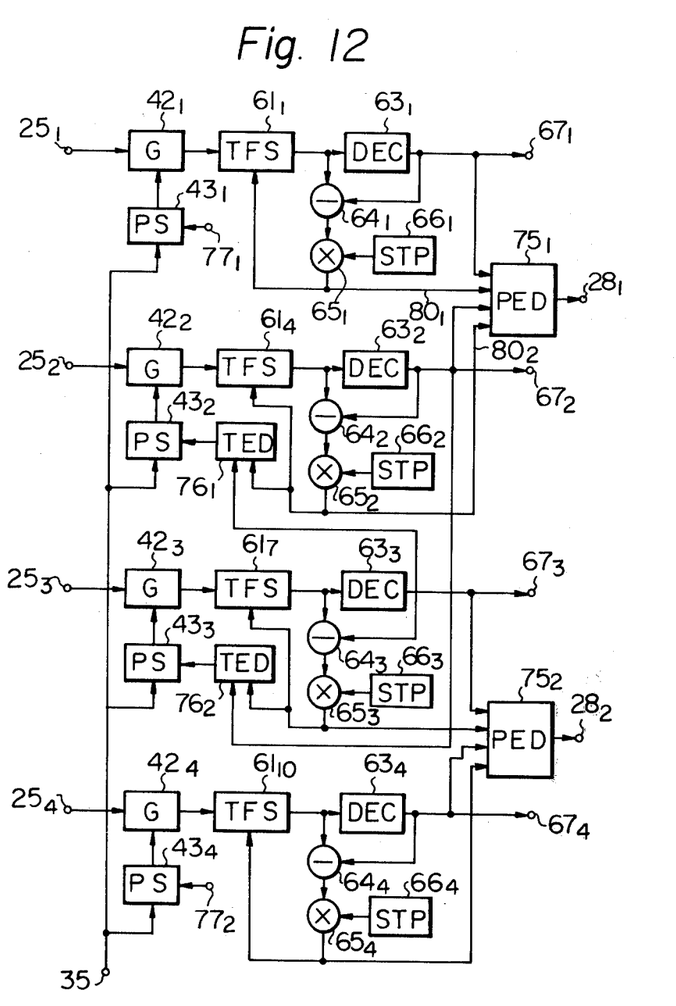
FIG. 12 is a block-diagram of the other automatic equalizer.

FIG. 12 illustrates another embodiment of the automatic equalizer according to the present invention, in which $61_1, 61_4, 61_7$ and $61_{10}$ are transversal filter portions (to be referred to as TFS's, hereinafter); $63_1, \ldots, 63_4$ are decision circuits; $64_1, \ldots, 64_4$ are substracters; $65_1, \ldots, 65_4$ are multipliers; $66_1, \ldots, 66_4$ are step generators; and $67_1, \ldots, 67_4$ are output terminals; and such components fulfills the same functions as the functions of the corresponding components in the automatic equalizer of FIG. 10. In FIG. 12, $25_1, \ldots, 25_4$ are input terminals; $42_1, \ldots, 42_4$ are sampling gates; $43_1, \ldots, 43_4$ are variable phase shifters; and 35 is a clock signal input terminal; and such components function in the same manner as the input terminal $25_1$, the sampling gate 42, the variable phase shifter 43, and the clock signal input terminal 35 in the sampling circuit of FIG. 8. Furthermore, in FIG. 12, $75_1$ and $75_2$ are phase error detectors having output terminals $28_1$ and $28_2$, respectively; $76_1$ and $76_2$ are timing error detectors; and $77_1$ and $77_2$ are timing control terminals. The input terminals $25_1, \ldots, 25_4$ are connected to the output terminals $25_1, \ldots, 25_4$ of the demodulator of FIG. 6, and the demodulated outputs are sampled at the sampling gates $42_1, \ldots, 42_4$, equalized by the TFS's $61_1, 61_4, 61_7,$ and $61_{10}$, and then quantized by the decision circuits $63_1, \ldots, 63_4$, so as to be delivered to the output terminals $67_1, \ldots, 67_4$. Here, the TFS's $61_1, 61_4, 61_7,$ and $61_{10}$ compensate for the inter-symbol interferences within the respective channels in the same manner as those of FIG. 10, but the interchannel interferences cannot be compensated for. However, the output terminals $28_1$ and $28_2$ of the phase error detectors $75_1$ and $75_2$ are connected to the phase control terminals $28_1$ and $28_2$ of the demodulator of FIG. 6 for controlling the phase angles of the carrier waves $C_1$ and $C_2$, so that the interference between the two channels having the same carrier waves, i.e., the interference between the channel 1 and the channel 2 and the interference between channel 3 and the channel 4, can be eliminated. Besides, the output signals from the timing error detectors $76_1$ and $76_2$ are applied to the control terminals of the variable phase shifters $43_2$ and $43_3$ for controlling the timing phases of the channel 2 and the channel 3, so that the interference between the adjacent channels using different carrier waves, i.e., the interference between the channel 2 and the channel 3, can be eliminated.

Figure 13:
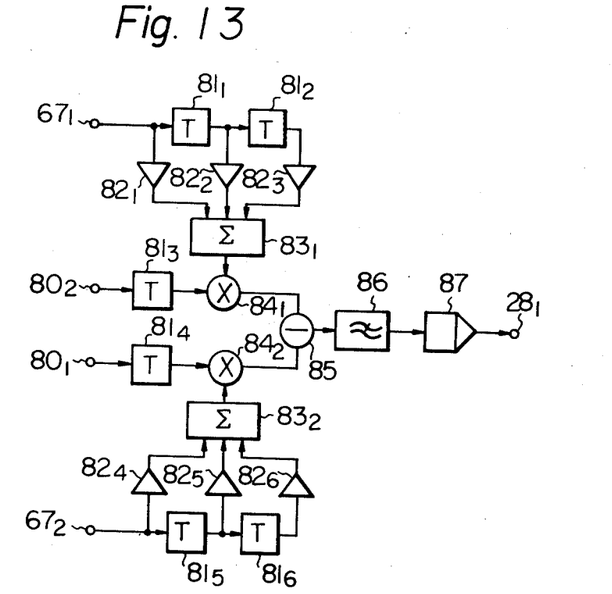
FIG. 13 is a block-diagram of the phase error detector (PED) in the automatic equalizer of FIG. 12.
Figure 14:
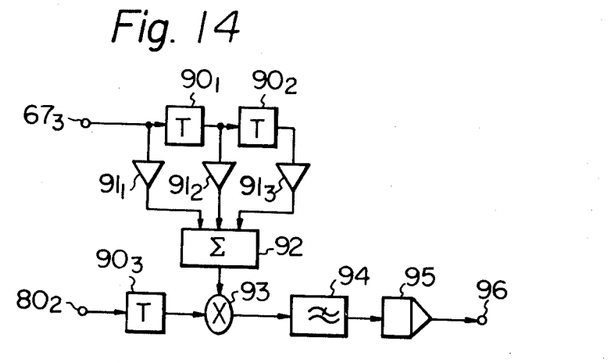
FIG. 14 is a block-diagram of the timing error detector (TED) in the automatic equalizer of FIG. 12.

FIG. 13 shows the details of the phase error detector $75_1$ or $75_2$ of FIG. 12, and FIG. 14 shows the details of the timing error detector $76_1$ or $76_2$ of FIG. 12. In FIG. 13, $67_1$ and $67_2$ are signal input terminals; $80_1$ and $80_2$ are error input terminals; $81_1, \ldots, 81_6$ are one sample delay elements; $82_1, \ldots, 82_6$ are attenuators; $83_1$ and $83_2$ are adders; $84_1$ and $84_2$ are multipliers; 85 is a subtracter; 86 is a low-pass filter; 87 is an accumulator; and $28_1$ is an output terminal. The weighted sum $\Sigma \hat{x}_{ln-m} \cdot h_m$ of the demodulated signals $\hat{x}_{ln}$ of the channel 1 delivered from the signal input terminal $67_1$ is obtained at the output from the transversal filter consisting of the delay elements $81_1$, $81_2$, the attenuators $82_1$, $82_2$, $82_3$, and the adder $83_1$. Here, $h_m(m = -1,0,1)$ is the gain of the attenuators $82_1$, $82_2$, $82_3$, and the gain $h_m$ in the illustrated example is selected to be $$h_m = h(mT + 2d) \qquad (14)$$

here, $h(t)$ is the inverse Fourier transform of the following quantity.

$$H(f) = A(f)^2 \cos 2\theta_c(f) \exp(i4\pi df) \operatorname{tm}(15)$$

This output signal is multiplied with the error signal (whose amplitude is modified by the adapting step) $e_{2n}$ of the channel 2 at the output of the delay element $81_3$, and the product is applied to the low-pass filter 86 through the substracter 85 for smoothing, and then applied to the accumulator 87, so as to form the phase control signal. The delay elements $81_5$, $81_6$, the attenuators $82_4$, $82_5$, $82_6$, and the adder $83_2$ constitute another transversal filter, which has the same characteristics as the aforesaid transversal filter, and the demodulated signal $\hat{x}_{2n}$ of the channel 2 is applied to the input terminal $67_2$ of the aforesaid other transversal filter while applying the error signal $e_{In}$ of the channel 1 at the error input terminal $80_1$, so as to produce a weighted means $-e_{In} \cdot \Sigma h_m \cdot \hat{x}_{2n-m}$ at the output terminal $28_1$ in the same manner as described above, which is superposed to said output. This output signal controls the phase angle of the carrier wave $C_1$, so that the interference between the channel 1 and the channel 2 can be removed, as will be explained hereinafter.

The interferences from the channels 2 and 1 included in the demodulated output signals of the channels 1 and 2, respectively, can be given by the following equations, based on the foregoing equation (8).

$$\left. \begin{array}{l} e_1(t) = \sum\limits_{m=-\infty}^{\infty} x_{2m} h_{21}(t - mt + 2d) \\ e_2(t) = \sum\limits_{m=-\infty}^{\infty} x_{1m} h_{12}(t - mT + 2d) \end{array} \right\} \qquad (16)$$

here, $h_{12}(t)$ and $h_{21}(t)$ can be given by the following expression, based on the foregoing equation (5).

$$h_{12}(t) = h(t) \sin(\phi_t - \phi_r)$$
$$h_{21}(t) = -h(t) \sin(\phi_t - \phi_r) \qquad (17)$$

Since it is sufficient to minimize the means square value of the inter-channel interference, as given by the following equation (18), by modifying the phase angle $\phi_r$ of the received carrier wave, $$Q(\phi_r) = <e_1(t)^2> + <e_2(t)^2> \qquad (18)$$

the gradient of the object function $Q(\phi_r)$, as given by the following equation (19), may be derived and used as the control signal.

$$\frac{\delta Q(\Theta_r)}{\delta \Theta_r} = 2<e_1(t) \sum_m x_{2m} h(t - mT + 2d) \cos(\Theta_t - \Theta_r)> \\ -2<e_2(t) \sum_m x_{1m} h(t - mT + 2d(\cos(\Theta_t - \Theta_r)> \qquad (19)$$

It is apparent from the foregoing description that the phase error detector of FIG. 13 derives the approximate value of the aforesaid gradient. In FIG. 13, even when the signal input terminal $67_1$ and the error input terminal $80_2$ are interchanged, the same operation can be achieved. The phase error detector $75_2$ for the phase control of the carrier wave $C_2$ is similarly constructed.

In FIG. 14, $67_3$ is a signal input terminal; $80_2$ is an error input terminal; $90_1, \ldots, 90_3$ are one sample delay elements; $91_1, \ldots, 91_3$ are attenuators; 92 is an adder; 93 is a multiplier; 94 is a low-pass filter; 95 is an accumulator; and 96 is an output terminal. The gains of the attenuators $91_1$, $91_2$, and $91_3$ are set as follows, respectively.

$$h'_{cm} = h'_{32}(mT + 2d) \quad (m = -1,0,1) \qquad (20)$$

here $h'_{32}(t)$ is the derivative of the inverse Fourier transform of the following quantity.

$$H_{32}(f) = -ie^{i4\pi df} A(f) [A(f - f_s)] \qquad (21)$$

In FIG. 14, the demodulated signal $\hat{x}_{3n}$ of the channel 3 is applied to the signal input terminal $67_3$, while the error signal $e_{2n}$ of the channel 2 is applied to the error input terminal $80_2$, so that a transversal filter consisting of the delay elements $90_1$, $90_2$, the attenuators $91_1$, $91_2$, $91_3$, and the adder 92 coacts with the delay element $90_3$ and the multiplier 93 for producing the following value in the same manner as that of FIG. 13.

$$e_{2n} \cdot \sum_m h'_{cm} \hat{x}_{3,n-m} \qquad (22)$$

The output from the multiplier 93 is smoothed by the low-pass filter 94 and delivered to the output terminal 96 through the accumulator 95. This output signal controls the phase shifter $43_2$ for controlling the phase angle of the sampling timing of the channel 2, so as to eliminate the interference from the channel 3 to the channel 2 in the manner to be explained hereinafter.

The interference from the channel 3 to the channel 2 is given by $$e_{23}(t) = \sum_{m=-\infty}^{\infty} x_{3m} h_{32}(t - mT + 2d) \qquad (23)$$

here, $h_{32}(t)$ is the inverse Fourier transform of $H_{32}(f)$ of the equation (21) which assumes zero value at $t = nT + 2d$ ($n = \ldots, 31$ 1, 0, 1).

Thus, in order to eliminate this interference, it is sufficient to modify the sampling timing phase $\tau$ of the channel 2, so as to minimize the following mean square value of the inter-channel interference.

$$Q(\tau) = <e_{23}(\tau)^2> \qquad (24)$$

Thus, the gradient of this object function $Q(\tau)$ may be derived, as shown in the following equation (25), for using it as the control signal in a feedback loop.

$$\frac{\delta Q(\tau)}{\delta \tau} = 2<e_{23}(\tau) \cdot \sum_m x_{3m} h'_{32}(\tau - mT + 2d)> \qquad (25)$$

It is apparent that the value of the equation (22), as derived in the circuit of FIG. 14, is an estimated value of the gradient of the equation (25). It should be noted here that, even if the signal input terminal $67_3$ and the error input terminal $80_2$ are interchanged, the same result can be achieved, provided that the sequential order of the attenuators $91_1$, $91_2$, and $91_3$ is reversed. For the timing control of the channel 3, a timing error detector $76_2$ with similar construction is used.

Since the timing control of the channel 1 and the channel 4 at the edges of the transmission band is irrelvant to the inter-channel interference, such timing control can be set so as to minimize the inter-symbol interference in the individual channel, and the method of FIG. 8 may be used for this purpose. More particularly, the system to the right of the output terminal of the sampling gate 42 of FIG. 8 may be connected to the output terminal of the sampling gate $42_1$ of FIG. 12, while connecting the output from the accumulator 50 of FIG. 8 to the timing control terminal $77_1$ of FIG. 12. As a more effective method, the timing may be so controlled as to minimize the intersymbol interference at the output of the transversal filter portion of the automatic equalizer.

Figure 15:
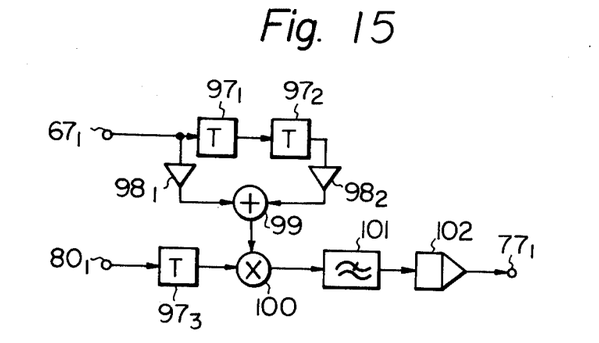
FIG. 15 is a block-diagram of the other timing error detector utilized at the end channels in the automatic equalizer of FIG. 12.

FIG. 15 shows an example of timing error detectors based on this method, in which $67_1$ is a signal input terminal; $80_1$ is an error input terminal; $97_1$, $97_2$, and $97_3$ are one-sample delay elements; $98_1$ and $98_2$ are attenuators; 99 is an adder; 100 is a multiplier; 101 is a low-pass filter; 102 is an accummulator; and $77_1$ is an output terminal. The demodulated signal $x_{1n}$ of the channel 1 is applied to the signal input terminal $67_1$, while the error signal $e_{1n}$ of the channel 1 is applied to the error input terminal $80_1$, and the gains of the attenuators $98_1$ and $98_2$ are set at $h'_m (m = -1, 1)$, as defined by the foregoing euqation (13)′, respectively. As in the case of the system of FIG. 14, the system of FIG. 15 derives the mean value of the following quantity.

$$e_{1n} \cdot \sum_{m \neq 0} \hat{h}'_m x_{1,n-m} \quad (26)$$

This output signal is applied to the control terminal $77_1$ of the phase shifter $43_1$ of FIG. 12 for controlling the timing phase of the channel 1, so as to minimize the inter-symbol interference at the channel 1, as will be explained hereinafter.

Since the inter-signal interference of the channel is given by $$e_1(t) = \sum_{m \neq 0} x_{1m} h_{11}(t - mT + 2d) \quad (27)$$

the object function becomes the mean square value thereof, as given by $$Q(\tau) = <e_1(\tau)^2> \quad (28)$$

and the gradient with respect to its timing error $\tau$ becomes $$\frac{\delta Q(\tau)}{\delta \tau} = 2 <e_1(\tau) \cdot \sum_{m \neq 0} x_{1m} h'_{11}(\tau - mT + 2d)> \quad (29)$$

here, $h'_{11}(t)$ is the derivative of $h_{11}(t)$.

Since the means value of the equation (26), as determined by the system of FIG. 15, is an estimated value of the gradient of the equation (29), it is apparent that the inter-symbol interference can be minimized by the feedback control using the means value of the equation (26) as its control signal.

As described in the foregoing, the inter-channel interference can be eliminated by controlling the phase of the received carrier waves and the timing of the sampling signal with the error signal obtained from the automatic equalizer, so that the TFS's in the automatic equalizer of FIG. 10 for compensating for the inter-channel interference can be dispensed with. As a result, the size of the automatic equalizer can be reduced ½ to ⅓ which greatly improves its economy.

When the aforesaid modulators, demodulators, and automatic equalizers are used, even if the transmission line is not perfectly equalized, a highly efficient and stable data transmission, which is substantially free from the inter-channel interference and the inter-symbol interference, can be realized. As a result the characteristics of the multi-channel orthogonal multiplex VSB transmission can be fully utilized.

Although an embodiment using four channel transmission has been described, the present invention can be similarly applied to the transmission using an arbitrary number of channels.

What is claimed is:

1. A mutli channel multiplex orthogonal VSB transmission system comprising a modulator, a demodulator and a transmission means arranged between the modulator and the demodulator; said modulator comprising at least a two-channel modulator, means for generating a plurality of carrier waves at the frequency interval $f_c$ where $f_c$ is the pulse repetition frequency in each channels; and wherein said two-channel modulator comprises; means connected to each input channel for obtaining the sum and the difference of PAM signals of each pair of input channels, a pair of roll-off filters connected to the output of said means for the sum and the difference respectively, said roll-off filters having the equal amplitude roll-off characteristic less than 50%, a predetermined equal fixed delay and the phase characteristics of 45% and $-45°$ respectively in the amplitude roll-off region, a variable phase shifter for shifting the phase of said carrier waves, a fixed phase shifter for delaying the phase of the output of said variable phase shifter by 90°, a first multiplying means inputs of which being connected to the output of one of said roll-off filters and the output of said fixed phase shifter, a second multiplying means inputs of which being connected to the output of the other roll-off filter and the output of said variable phase shifter, and means for adding the outputs of said first and second multiplying means and providing the output of the two-channel modulator.

2. A multi-channel multiplex orthogonal VSB transmission system according to claim 1, wherein said demodulator comprises; means for re-generating a receiving carrier wave from a received carrier wave, means for generating a demodulation carrier wave by using a variable phase shifter or a voltage controlled oscillator having the center frequency equal to the receiving carrier wave, a plurality of multiplying means for multiplying the input signals with the demodulation carrier waves, a plurality of roll-off filters the input of which being connected to the outputs of the multiplying means, and means for providing the sum and the difference of the two outputs of said roll-off filters and for providing a demodulated signal.

3. A demodulator according to claim 2, further comprising means for controlling the phase of said demodulation carrier wave, said means comprises means for detecting the polarity of a pair of demodulated signals, a pair of multiplying means for multiplying the output of the detecting means with the other demodulated signal, means for providing the difference between two outputs of said pair of multiplying means, and a low pass filter connected to the output of said means for providing the difference.

4. A multi-channel multiplex orthogonal VSB transmission system according to claim 1, further comprising a sampling circuit, said sampling circuit comprises a sampling pulse generation circuit having a band-pass filter (51) of center frequency $f_c/2$ connected to a demodulated signal, a square circuit (52) connected to the output of said band pass filter, a second band-pass filter (53) of center frequency $f_c$ connected to the output of said square circuit (53), and a phase-controlled oscillator (54) connected to the output of said second band pass filter; a plurality of delay circuits ($45_1$, $45_2$, $45_3$, $45_4$) for delaying the sampled signal; a multiplying means (48) for multiplying the signal from the center tap of said delay circuits with the sum of the signals from the another taps of said delay circuits; a smoothing means (49, 50) connected to the output of said multiplying means; a phase shifter (43) for shifting the phase of the sampling pulse according to the output of said smoothing means; and means (42) for sampling an input signal according to the output of said phase shifter (43).

5. A multi-channel multiplex orthogonal VSB transmission system according to claim 1, further comprising an automatic equalizer the input of which being connected to the output of the sampling means (42), said automatic equalizer comprises a plurality of transversal filters ($61_1$–$61_{10}$) provided three sets for each internal channels and two sets for the end channels; an adder ($62_1$–$62_4$) for adding the outputs of said transversal filters for each channel; a decision circuit ($63_1$–$63_4$) for quantizing the output of said adder; an error detecting circuit ($64_1$–$64_4$) for detecting the error in the quantization; and means for changing the amplitude of said error and for changing the weight coefficients of said transversal filters.

6. A multi-channel multiplex orthogonal VSB transmission system according to claim 1, further comprising an automatic equalizer the input of which being connected to the output of the sampling means (42), said automatic equalizer comprises a transversal filter ($61_1$, $61_4$, $61_7$, $61_{10}$) provided for each channel; a decision circuit ($63_{1-634}$) for quantizing the output of said transversal filter; an error detecting circuit ($64_1$–$64_4$) for detecting the error in the quantization; and means for changing the amplitude of said error and for changing the coefficient of said transversal filter, the phase of the demodulation carrier wave and the timing of a sampling pulse.

7. The invention as defined in claim 6, further comprising means ($75_1$, $75_2$) for changing the phase of the demodulation carrier wave, comprising a correlation means for calculating the correlation between one of the demodulated signals having the common carrier wave and the error signal of the other demodulated signal, a transversal filter connected to one of the inputs of said correlaton means, and the phase of the demodulation carrier wave being changed by the output by said correlation means.

8. The invention as defined in claim 6, further comprising means ($76_1$, $76_2$) for changing the timing of a sampling pulse, comprising a correlation means for calculating the correction between one of the sequential demodulated signals having the common carrier wave and the error signal of the other demodulated signal, a transversal filter connected to one of the inputs of said correlation means, and the timing of a sampling pulse being changed by the output of said correlation means.

9. The invention as defined in claim 6, further comprising means ($61_1$, $61_{10}$) for changing the timing of a sampling pulse, comprising a correlation means for calculating the correlation between the demodulated signal of an end channel and the error signal, a transversal filter connected to one of the inputs of said correlation means, and the timing of a sampling pulse being changed by the output of said correlation means.

10. A multi-channel multiplex orthogonal VSB transmission system according to claim 1, further including said modulator comprising a plurality of said two channel modulators and means for summing the output of said plurality of two channel modulators and providing the output of said modulator.

* * * * *

UNITED STATES PATENT AND TRADEMARK OFFICE
CERTIFICATE OF CORRECTION

PATENT NO. : 4,053,713
DATED : October 11, 1977
INVENTOR(S) : Kazuhiko Nitadori

It is certified that error appears in the above-identified patent and that said Letters Patent are hereby corrected as shown below:

Col. 1, line 11, change "VSA" to --VSB--.

Col. 2, line 43, change "VAB" to --VSB--.

Col. 2, line 52, change "with" to --width--.

Col. 2, line 53, change "2/T(=[1/2T]X4)" to -- $\frac{2}{T}(=\frac{1}{2T}x4)$ --.

Col. 6, line 1, change "$H_{32}(f) = -ie_{i4\pi fd} A(f)$ ...etc." to --$H_{32}(f) = -ie^{i4\pi fd} A(f)$ ... etc.--

Col. 7, line 65, change "$\frac{2Q(T)}{2} = 2\sum_{m \neq 0} \langle x_{lm}^2 \rangle h_{11}(mT + 2d + T) \frac{2}{2T} h_{11}(mT+2d+T)$" to -- $\frac{2Q(T)}{2T} = 2\sum_{m \neq 0} \langle x_{lm}^2 \rangle h_{11}(mT + 2d + T) \frac{2}{2T} h_{11}(mT + 2d + T)$ --

Col. 12, line 17, equasion #(21), after "[A(f-$f_c$)" insert -- -A(f+$f_c$)] --.

Col. 12, line 48, change "31, 1,0,1" to -- -1,0,1 --.

Col. 13, line 26, over the "x", insert -- --

UNITED STATES PATENT AND TRADEMARK OFFICE
CERTIFICATE OF CORRECTION

PATENT NO. : 4,053,713
DATED : October 11, 1977
INVENTOR(S) : Kazuhiko Nitadori

It is certified that error appears in the above–identified patent and that said Letters Patent are hereby corrected as shown below:

Col. 16, line 3, change "$(63_1 - 634)$" to --$(63_1 - 63_4)$--.

Col. 16, line 24, change "correction" to --correlation--.

Signed and Sealed this

Eleventh Day of April 1978

[SEAL]

Attest:

RUTH C. MASON
Attesting Officer

LUTRELLE F. PARKER
Acting Commissioner of Patents and Trademarks